US012737264B2

(12) United States Patent
Kimchi et al.

(10) Patent No.: US 12,737,264 B2
(45) Date of Patent: Sep. 15, 2026

(54) SYSTEM AND METHOD FOR QUERYING A BACKUP OF A DATABASE SYSTEM BASED ON A TEMPORAL TABLE

(71) Applicant: Eon IO, Ltd., Tel Aviv (IL)

(72) Inventors: Ron Kimchi, Tel Aviv (IL); Ofir Ehrlich, Tel Aviv (IL); Dmitry Kuznetsov, Tel Aviv Yafo (IL); Assaf Natanzon, Tel Aviv (IL); Yaniv Ptashnik, Tel Mond (IL); Ran Mizrachi, Mishmar Hashiva (IL); Peleg Kazaz, Tel Aviv (IL); Benjamin Gruenbaum, Herzliya (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/035,026

(22) Filed: Jan. 23, 2025

(65) Prior Publication Data

US 2026/0211778 A1 Jul. 23, 2026

(51) Int. Cl.

| | |
|---|---|
| ***G06F 16/245*** | (2019.01) |
| ***G06F 11/1446*** | (2026.01) |
| ***G06F 16/22*** | (2019.01) |
| ***G06F 16/2458*** | (2019.01) |

(52) U.S. Cl.

CPC ........ *G06F 11/1464* (2013.01); *G06F 16/221* (2019.01); *G06F 16/245* (2019.01); *G06F 16/2477* (2019.01); *G06F 2201/80* (2013.01)

(58) Field of Classification Search

CPC .... G06F 16/23; G06F 16/245; G06F 16/2477; G06F 16/25; G06F 11/1464; G06F 2201/80; G06F 16/221

See application file for complete search history.

(56) References Cited

U.S. PATENT DOCUMENTS

| | | | | |
|---|---|---|---|---|
| 9,262,491 | B2 * | 2/2016 | Nambiar | G06F 16/25 |
| 12,174,845 | B1 * | 12/2024 | Gordon | G06F 11/1458 |
| 2011/0191299 | A1 * | 8/2011 | Huynh Huu | G06F 16/2358 707/648 |
| 2020/0012659 | A1 * | 1/2020 | Dageville | G06F 16/273 |
| 2020/0364201 | A1 * | 11/2020 | Cseri | G06F 16/235 |
| 2022/0019784 | A1 * | 1/2022 | Wen | G06F 40/289 |
| 2023/0409545 | A1 * | 12/2023 | Gupta | G06F 16/211 |
| 2024/0354300 | A1 * | 10/2024 | Plattner | G06F 16/2455 |
| 2024/0427794 | A1 * | 12/2024 | Dhaliwal | G06F 16/258 |

* cited by examiner

*Primary Examiner* — James E Richardson

(74) *Attorney, Agent, or Firm* — M&B IP Analysts, LLC

(57) ABSTRACT

A method and system for generating a temporal, query-ready database backup. The method includes generating a plurality of backups of a database, each of the backups including a plurality of backup data objects, each of the backup data objects including a plurality of rows stored in a file having a column-oriented format, and each backup corresponding to a unique point in time; assigning each row in a file to a row group, the row group having a unique identifier; generating a temporal table including a column of row group identifiers for each backup of the plurality of backups; receiving a query for a backup of the plurality of backups created at different point in times; and generating a query result based on the temporal table and at least the respective backup data object, wherein results are from backups of the plurality of backups related to different point in time.

19 Claims, 10 Drawing Sheets

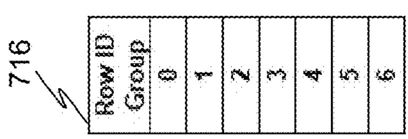

716

| Row ID Group |
| --- |
| 0 |
| 1 |
| 2 |
| 3 |
| 4 |
| 5 |
| 6 |

710

| ID | First Name | Last Name |
| --- | --- | --- |
| 1 | John | Doe |
| 3 | Alice | Johnson |
| 5 | Charlie | Davis |
| 6 | Diana | White |
| 8 | Eve | Moore |
| 10 | Grace | Anderson |
| 12 | Irene | Jackson |
| 14 | Karen | Harris |
| 15 | Larry | Clark |
| 17 | Nancy | Walker |
| 19 | Paul | Allen |
| 20 | Quinn | Young |
| 22 | Sam | Wright |
| 24 | Uma | Hill |
| 25 | Victor | Scott |
| 27 | Xavier | Adams |
| 29 | Zach | Carter |
| 30 | Alan | Collins |
| 32 | Carl | Foster |
| 34 | Ethan | Hughes |

712

| ID | First Name | Last Name | Row ID Group |
| --- | --- | --- | --- |
| 1 | John | Doe | 0 |
| 3 | Alice | Johnson | 0 |
| 5 | Charlie | Davis | 1 |
| 6 | Diana | White | 1 |
| 8 | Eve | Moore | 1 |
| 10 | Grace | Anderson | 2 |
| 12 | Irene | Jackson | 2 |
| 14 | Karen | Harris | 2 |
| 15 | Larry | Clark | 3 |
| 17 | Nancy | Walker | 3 |
| 19 | Paul | Allen | 3 |

714

| ID | First Name | Last Name | Row ID Group |
| --- | --- | --- | --- |
| 20 | Quinn | Young | 4 |
| 22 | Sam | Wright | 4 |
| 24 | Uma | Hill | 4 |
| 25 | Victor | Scott | 5 |
| 27 | Xavier | Adams | 5 |
| 29 | Zach | Carter | 5 |
| 30 | Alan | Collins | 6 |
| 32 | Carl | Foster | 6 |
| 34 | Ethan | Hughes | 6 |

FIGURE 7A

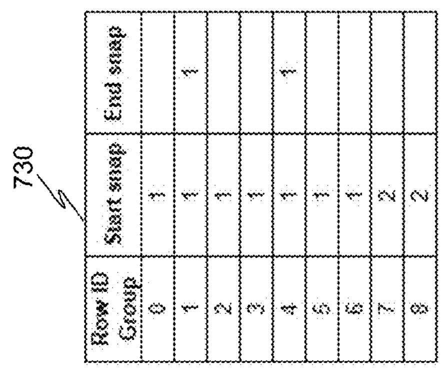

| Row ID Group | Start snap | End snap |
|---|---|---|
| 0 | 1 | |
| 1 | 1 | 1 |
| 2 | 1 | |
| 3 | 1 | |
| 4 | 1 | 1 |
| 5 | 1 | |
| 6 | 1 | |
| 7 | 2 | |
| 8 | 2 | |

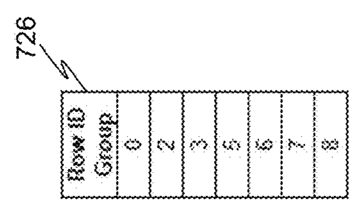

| Row ID Group |
|---|
| 0 |
| 2 |
| 3 |
| 5 |
| 6 |
| 7 |
| 8 |

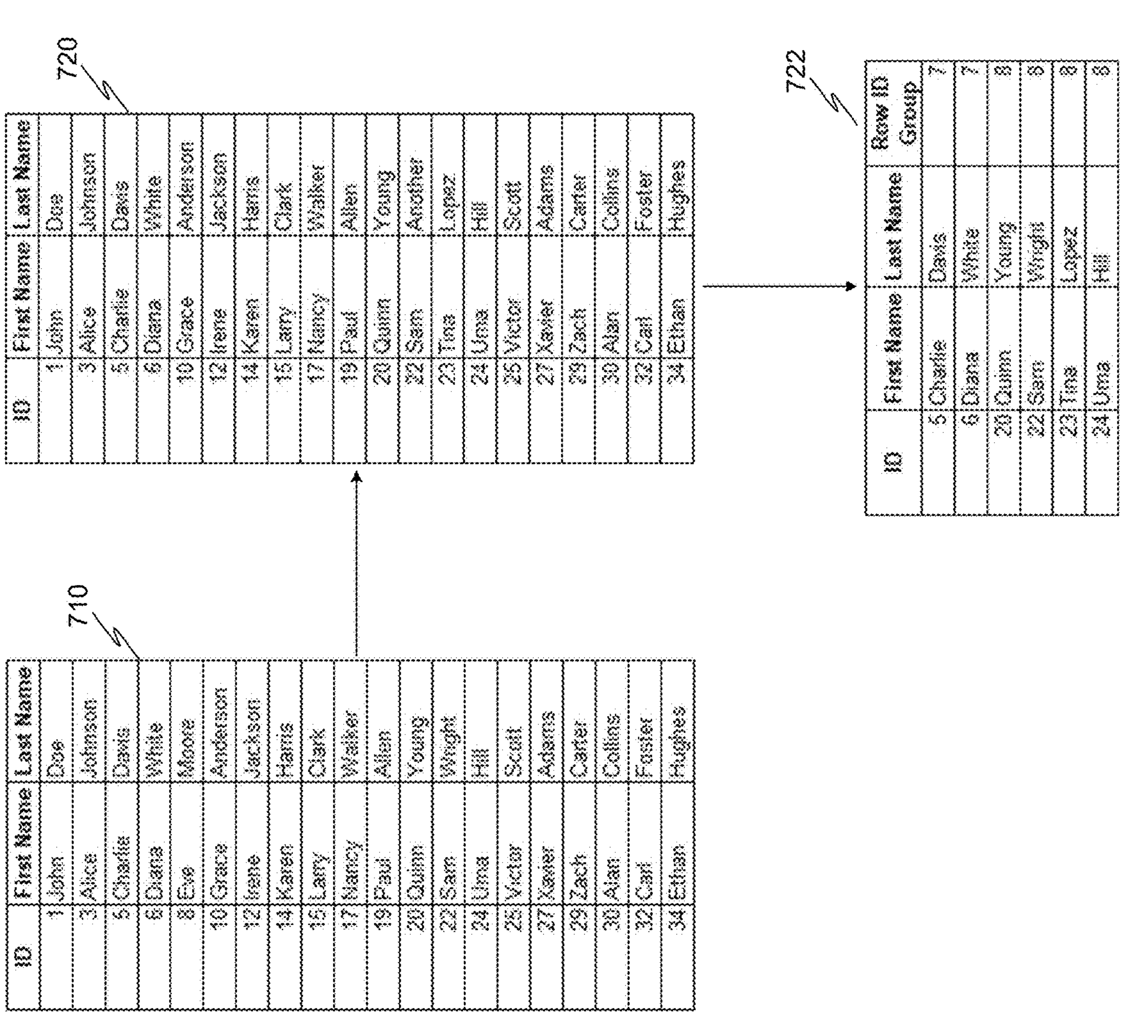

| ID | First Name | Last Name |
|---|---|---|
| 1 | John | Doe |
| 3 | Alice | Johnson |
| 5 | Charlie | Davis |
| 6 | Diana | White |
| 8 | Eve | Moore |
| 10 | Grace | Anderson |
| 12 | Irene | Jackson |
| 14 | Karen | Harris |
| 15 | Larry | Clark |
| 17 | Nancy | Walker |
| 19 | Paul | Allen |
| 20 | Quinn | Young |
| 22 | Sam | Wright |
| 24 | Uma | Hill |
| 25 | Victor | Scott |
| 27 | Xavier | Adams |
| 29 | Zach | Carter |
| 30 | Alan | Collins |
| 32 | Carl | Foster |
| 34 | Ethan | Hughes |

| ID | First Name | Last Name |
|---|---|---|
| 1 | John | Doe |
| 3 | Alice | Johnson |
| 5 | Charlie | Davis |
| 6 | Diana | White |
| 10 | Grace | Anderson |
| 12 | Irene | Jackson |
| 14 | Karen | Harris |
| 15 | Larry | Clark |
| 17 | Nancy | Walker |
| 19 | Paul | Allen |
| 20 | Quinn | Young |
| 22 | Sam | Another |
| 23 | Tina | Lopez |
| 24 | Uma | Hill |
| 25 | Victor | Scott |
| 27 | Xavier | Adams |
| 29 | Zach | Carter |
| 30 | Alan | Collins |
| 32 | Carl | Foster |
| 34 | Ethan | Hughes |

| ID | First Name | Last Name | Row ID Group |
|---|---|---|---|
| 5 | Charlie | Davis | 7 |
| 6 | Diana | White | 7 |
| 20 | Quinn | Young | 8 |
| 22 | Sam | Wright | 8 |
| 23 | Tina | Lopez | 8 |
| 24 | Uma | Hill | 8 |

FIGURE 7B

SYSTEM AND METHOD FOR QUERYING A BACKUP OF A DATABASE SYSTEM BASED ON A TEMPORAL TABLE

TECHNICAL FIELD

The present disclosure relates generally to digital backup querying, and specifically to performing a backup of a database system that can be queried at multiple points in time.

BACKGROUND

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restore. Differential backups store changes made since the last full backup, striking a balance between efficiency and ease of recovery.

Backup strategies play a critical role in deciding how often backups are taken and where they are stored. A common approach is the 3-2-1 strategy, which involves keeping three copies of data: the original plus two backups, with one stored offsite. In production environments, backups may occur at varying intervals-such as daily or weekly-depending on the organization's tolerance for data loss and downtime, often referred to as the Recovery Point Objective (RPO) and Recovery Time Objective (RTO). For high-demand systems, continuous or near-real-time backups, known as transaction log backups, are used to ensure minimal data loss. Additionally, automated backups in the cloud have become increasingly popular, offering scalability and offsite storage by default, which simplifies disaster recovery processes.

However, there are challenges specific to cloud-based backups. One significant issue is latency, where the time taken to transfer large amounts of data to and from the cloud can hinder backup and restoration speed. This can be particularly problematic for large databases that need quick recovery.

To overcome this, some solutions allow fast restoration of a database by doing an instance mount of the database and then querying the mounted database. While such a solution allows a user to access some content of the database, this still typically takes a significant amount of time. Further complicating this, if an incorrect version of the database is restored, a correction can be a long and error-prone process.

In addition, cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored might cause a cybersecurity risk, as an outdated application.

It would therefore be advantageous to provide a solution that would overcome the challenges noted above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, the method may include generating a plurality of backups of a database, each of the backups including a plurality of backup data objects, each of the backup data objects including a plurality of rows stored in a file having a column-oriented format, and each backup corresponding to a unique point in time. The method may also include assigning each row in a file to a row group, the row group having a unique identifier. The method may furthermore include generating a temporal table including a column of row group identifiers for each backup of the plurality of backups. The method may in addition include receiving a query for a backup of the plurality of backups created at different points in time. The method may moreover include generating a query result based on the temporal table and at least the respective backup data object, where the results are from backups of the plurality of backups related to different points in time. Other embodiments of this aspect include corresponding computer systems, apparatus, and computer programs recorded on one or more computer storage devices, each configured to perform the actions of the methods.

Implementations may include one or more of the following features. The method may include: generating a relevancy table based on each unique identifier; and inserting a first value in the relevancy table indicating a first time of entry for a unique identifier. The method may include: inserting a second value in the relevancy table indicating a final time of entry for the unique identifier. The method may include: inserting the second value in response to determining that a row group corresponding to the unique identifier includes a row with a changed value. The method may include: generating the query result further based on the relevancy table. The method may include: joining a plurality of query results, each query result based on a backup data object. The method may include: joining the plurality of query results based on a row identifier. The method may include: assigning each row to a row group based on a hash value generated for a row of the row group. The method may include: generating a plurality of temporal tables, each temporal table including identifiers of row groups stored in a backup generated at a time corresponding to a time associated with the temporal table. Implementations of the described techniques may include hardware, a method or process, or a computer tangible medium.

In one general aspect, a non-transitory computer-readable medium may include one or more instructions that, when executed by one or more processors of a device, cause the device to: generate a plurality of backups of a database, each of the backups including a plurality of backup data objects, each of the backup data objects including a plurality of rows stored in a file having a column-oriented format, and each backup corresponding to a unique point in time; assign each row in a file to a row group, the row group having a unique identifier; generate a temporal table including a column of row group identifiers for each backup of the plurality of backups; receive a query for a backup of the plurality of backups created at different points in times; and generate a query result based on the temporal table and at least the respective backup data object, where the results are from backups of the plurality of backups related to different points in times. Other embodiments of this aspect include corresponding computer systems, apparatus, and computer programs recorded on one or more computer storage devices, each configured to perform the actions of the methods.

In one general aspect, the system may include one or more processors. The system may also include generating a plurality of backups of a database, each of the backups including a plurality of backup data objects, each of the backup data objects including a plurality of rows stored in a file having a column-oriented format, and each backup corresponding to a unique point in time. The system may furthermore include assigning each row in a file to a row group, the row group having a unique identifier. The system may in addition include generating a temporal table including a column of row group identifiers for each backup of the plurality of backups. The system may moreover include receiving a query for a backup of the plurality of backups created at different points in time. The system may also include generating a query result based on the temporal table and at least the respective backup data object, where the results are from backups of the plurality of backups related to different points in time. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate a relevancy table based on each unique identifier; and insert a first value in the relevancy table indicating a first time of entry for a unique identifier. The system where the one or more processors are further configured to: insert a second value in the relevancy table indicating a final time of entry for the unique identifier. The system where the one or more processors are further configured to: insert the second value in response to determining that a row group corresponding to the unique identifier includes a row with a changed value. The system where the one or more processors are further configured to: generate the query result further based on the relevancy table. The system where the one or more processors are further configured to: join a plurality of query results, each query result based on a backup data object. The system where the one or more processors are further configured to: join the plurality of query results based on a row identifier. The system where the one or more processors are further configured to: assign each row to a row group based on a hash value generated for a row of the row group. The system where the one or more processors are further configured to: generate a plurality of temporal tables, each temporal table including identifiers of row groups stored in a backup generated at a time corresponding to a time associated with the temporal table. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 7A is an example diagram of a database backup generated a first time for querying across a timespan, implemented in accordance with an embodiment.

FIG. 7B is an example diagram of a database backup generated a second time for querying across a timespan, implemented in accordance with an embodiment.

DETAILED DESCRIPTION

Figure 1:
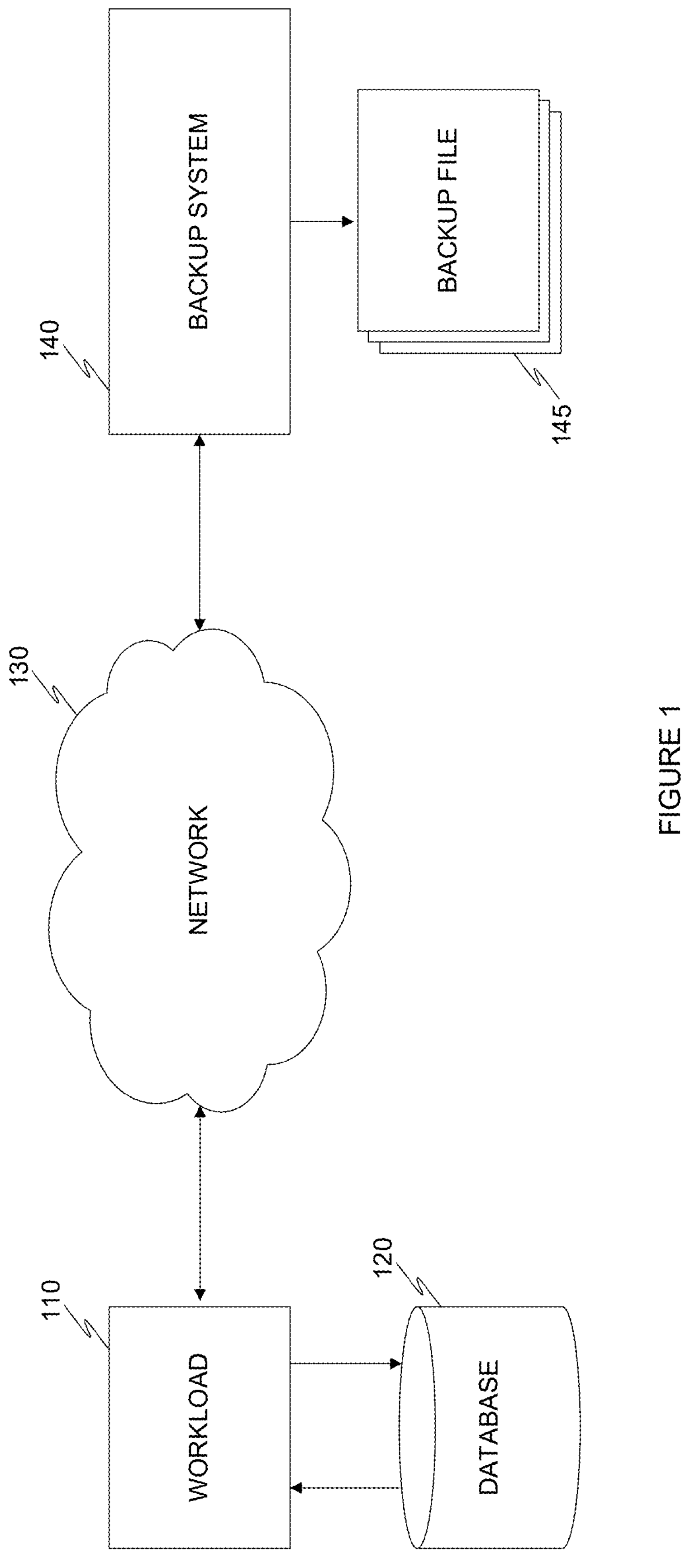
FIG. 1 is an example network diagram including a database backup system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram including a database backup system, utilized to describe an embodiment. In an embodiment, a database 120 includes a database application, a database management system (DBMS), a combination thereof, and the like. In some embodiments, the database 120 is a column-oriented database. In an embodiment, the database 120 is a relational database, a tabular relational database, and the like. For example, in an embodiment, the database 120 is implemented using SQL, MySQL, and the like query languages. In an embodiment, the database 120 includes metadata, such as a database schema. In some embodiments, the database schema includes a data structure, such as a table, including a plurality of keys, at least a portion of which correspond to columns of the table.

In certain embodiments, the database 120 is deployed on a workload 110. In an embodiment, the workload 110 is a physical computing device, a virtual computing device (e.g., a virtual machine), a combination thereof, and the like. In some embodiments, the workload 110 is a software container. In an embodiment, a software container is deployed on a software container platform, such as Kubernetes®, Docker®, and the like.

According to an embodiment, the workload 110 is implemented as a virtual machine, a software container, a serverless function, a combination thereof, and the like. In some embodiments, the database 120 is implemented as a managed database, for example utilizing Amazon® RDS. In an embodiment, a virtual machine is deployed as an Amazon®

EC2 instance. A software container is deployed, according to an embodiment, on a container platform such as Kubernetes®, Docker®, and the like. In some embodiments, a serverless function is deployed as an Amazon® Lambda function.

In an embodiment, the workload 110 is configured to provide access to the database 120, for example over a network 130. In some embodiments, a cloud computing infrastructure is implemented on the network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, the workload 110 is configured to provide access to the database 120 to a database backup system 140 (also referred to as backup system 140). In an embodiment, the backup system 140 is configured to generate a backup of the database 120. In an embodiment, the database backup system 140 is implemented as a virtual machine, a software container, a serverless function, a combination thereof, and the like.

In an embodiment, the backup system 140 is configured to generate a backup of a database by determining a primary key of the database 120. In some embodiments, the database backup includes a data backup and a machine backup. For example, according to an embodiment, the data backup includes only data of the database. In some embodiments, only data of the database includes data exported from the database, a database schema, a combination thereof, and the like.

In an embodiment, the machine backup includes data, information, and the like, which allows for generation of a restored machine (i.e., a restored virtualization) which is configured to host a database application capable of exposing the data restored from the data backup. In an embodiment, the machine is a virtualization instance such as a virtual machine, a software container, a serverless function, a combination thereof, and the like.

According to an embodiment, data, information, and the like that allow the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

In some embodiments, generating a machine backup is performed by mounting the file system of a virtual machine that hosts the database application, and generating a file-level backup that omits log files, table files, and the like data files of the database application. For example, in an embodiment, a file-level backup includes generating a storage-based snapshot of the virtual machine, i.e., a snapshot of at least a block device attached to the virtual machine, mounting the snapshot to a second virtual machine, and exporting data from the second virtual machine into a data backup. In an embodiment, exporting data includes executing a plurality of queries on a database application of the second virtual machine, where each query returns a plurality of rows of data from the database. Such data exportation from a database is discussed in more detail with respect to FIG. 3 below.

In an embodiment, generating a machine backup includes generating a block-level backup of a virtual machine on which the database application is deployed. In some embodiments, data blocks which include data of the database are released, so that they are not stored as part of the machine backup. This ensures that a block-level backup of the machine only is generated, without any of the data of the database application, the latter stored separately as a database data backup.

According to an embodiment, at least a file that includes database data is zeroed out, punched out, etc., prior to generating a machine backup (i.e., a backup of a state of the virtual machine without any of the data of the database). In some embodiments, it is advantageous to drop a table from a database application on a restored virtual machine prior to inserting the backed-up data. In an embodiment, dropping a table from a database application includes erasing all records (i.e., all data rows), deleting indexes, triggering permissions, etc., breaking foreign key constraints, releasing storage space assigned to the table, a combination thereof, and the like. In some embodiments, metadata of the database application is stored as part of the machine backup. In an embodiment, metadata includes a store procedure, a view, a schema, a combination thereof, and the like.

In certain embodiments, generating a machine backup includes detecting software applications deployed, executed, etc., on the workload 110 and storing a product key for each detected application. For example, in an embodiment, Apache® Derby is detected on the workload 110, and a product key for Derby is stored as a portion of the machine backup.

In an embodiment, when restoring the machine (e.g., the workload 110) from the machine backup, the product key is accessed, and a new installation of Apache® Derby is deployed on the restored machine. In an embodiment, restoring a machine includes configuring an orchestrator of a cloud computing environment to deploy a virtual machine (e.g., an Amazon®) EC2) in a cloud computing environment.

In certain embodiments, storing such product keys is advantageous as it allows for generating a machine with software applications that are up to date. This in turn reduces the risk of a cybersecurity breach due to vulnerable versions of software that can be deployed from a more straightforward database backup. This is a clear advantage of creating separate backups for the database data and the database software application (i.e., the machine backup).

In some embodiments, detecting a product key includes scanning a virtual machine, a disk of the virtual machine, and the like, to detect thereon a stored product key. In some embodiments, a product key is detected by accessing a registry of a machine, workload, virtual instance, and the like, and reading therefrom a product key, a plurality of product keys, and the like. In some embodiments, the product key is associated with an identifier of a software application. In certain embodiments, a software repository is determined, from which a software application can be downloaded, installed, etc., on a virtualization, based on the product key. For example, in some embodiments, an orchestrator is provided with a product key when instructed to deploy a virtualization and a software application is selected from a software repository accessible to the orchestrator.

In some embodiments, the backup system 140 is configured to generate a restored database. In an embodiment, the backup system 140 is configured to restore a machine backup into an operational machine (e.g., a virtual machine deployed in a cloud computing environment) and is further configured to restore database data into the restored (i.e., operational) machine, for example by utilizing the methods described in more detail herein, which results in a restored database.

In an embodiment, the backup system 140 is configured to generate a data backup based on the data stored in database 120. In certain embodiments, the data backup includes a plurality of backup files 145. In an embodiment, the backup files 145 are a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

In an embodiment, the backup system 140 is configured to determine a primary key of the database. In some embodiments, the backup system 140 is configured to generate a plurality of queries based on the primary key, each query returning a plurality of rows of data from the database. In an embodiment, the plurality of rows are stored as at least a column-oriented data file, e.g., the backup files 145.

According to an embodiment, a primary key is a database key that includes values that are unique for each row. For example, a primary key is, in an embodiment, an index value. As no two rows can have the same index value, an index value can be used as a primary key. In some embodiments, a primary key is a composite key, i.e., a combination of a key value of a first column and a key value of a second column, which together form a unique value.

Figure 2:
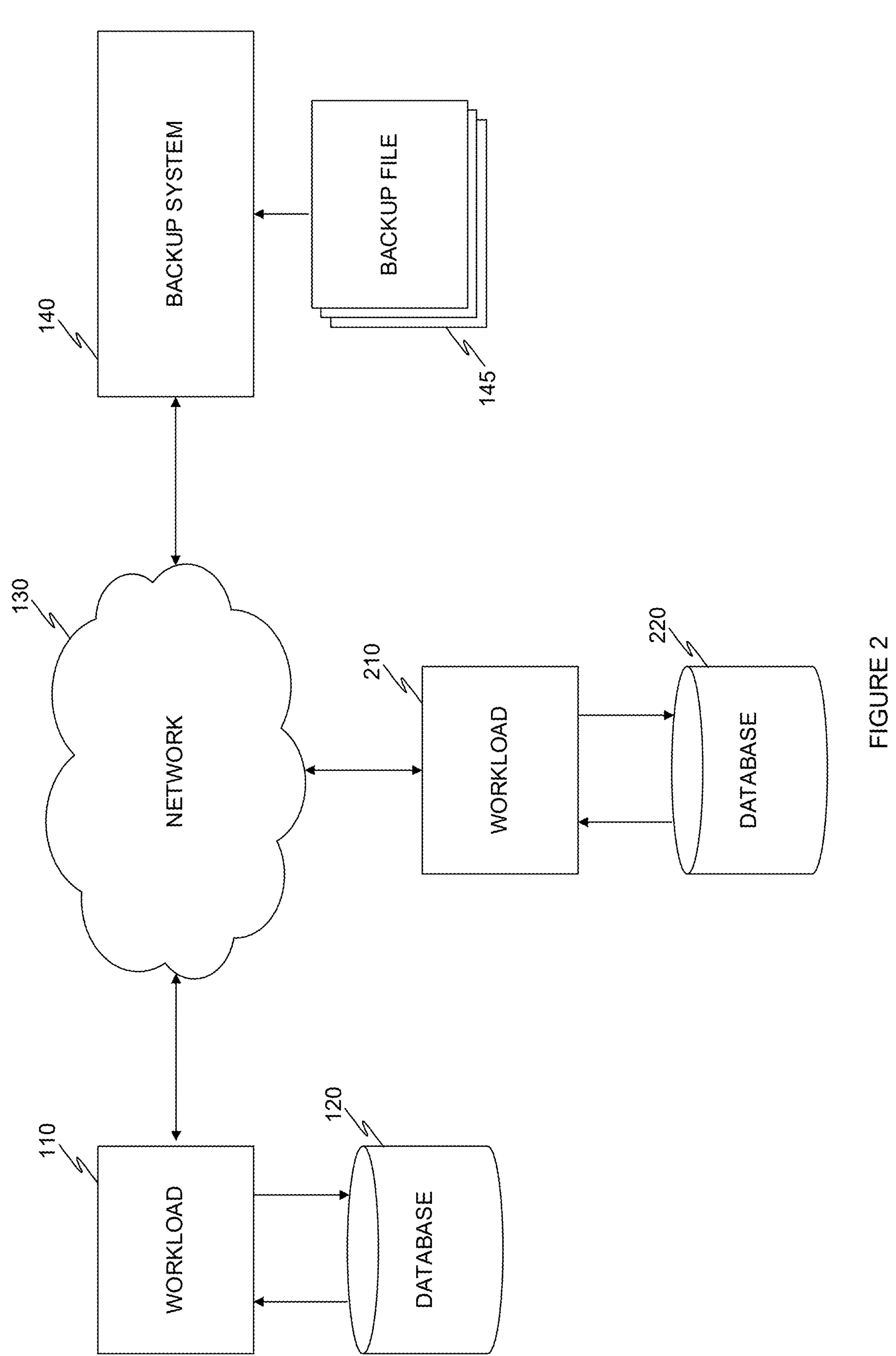
FIG. 2 is an example network diagram of a backup system performing a database restoration, utilized to describe an embodiment.

FIG. 2 is an example network diagram of a backup system performing a database restoration, utilized to describe an embodiment. According to an embodiment, a backup system 140 is configured to receive a request to restore a database application, including the database data thereof.

In an embodiment, the backup system 140 is configured to instruct an orchestrator (not shown), other provisioning device, and the like, to deploy a restored workload 210, which corresponds to the workload 110. For example, in an embodiment, the restored workload is deployed from an auto-scaling group (ASG) which is deployed in a VPC of a cloud computing environment.

In some embodiments, the backup system 140 is configured to restore the restored workload 210 based on a file-level backup, a block-level backup, a plurality of software keys, and the like. For example, in an embodiment, the backup system 140 is configured to generate, provision, etc., an empty bootable machine volume. In an embodiment, a bootable machine volume is implemented utilizing Amazon® Elastic Block Storage (EBS).

In some embodiments, data of the backup files 145 is copied into the database 220. In certain embodiments, the workload 210 is configured to query the backup files 145 while the data of the backup files 145 is being written, copied, etc., to the database 220. This provides access to the data while performing the restoration.

For example, according to an embodiment, a database application of the database 220 is configured to receive a query for execution thereon. In an embodiment, the database application is configured to execute the query on the backup data files 145 in response to determining that the backup data files 145 have not yet been completely written to the database 220.

Figure 3:
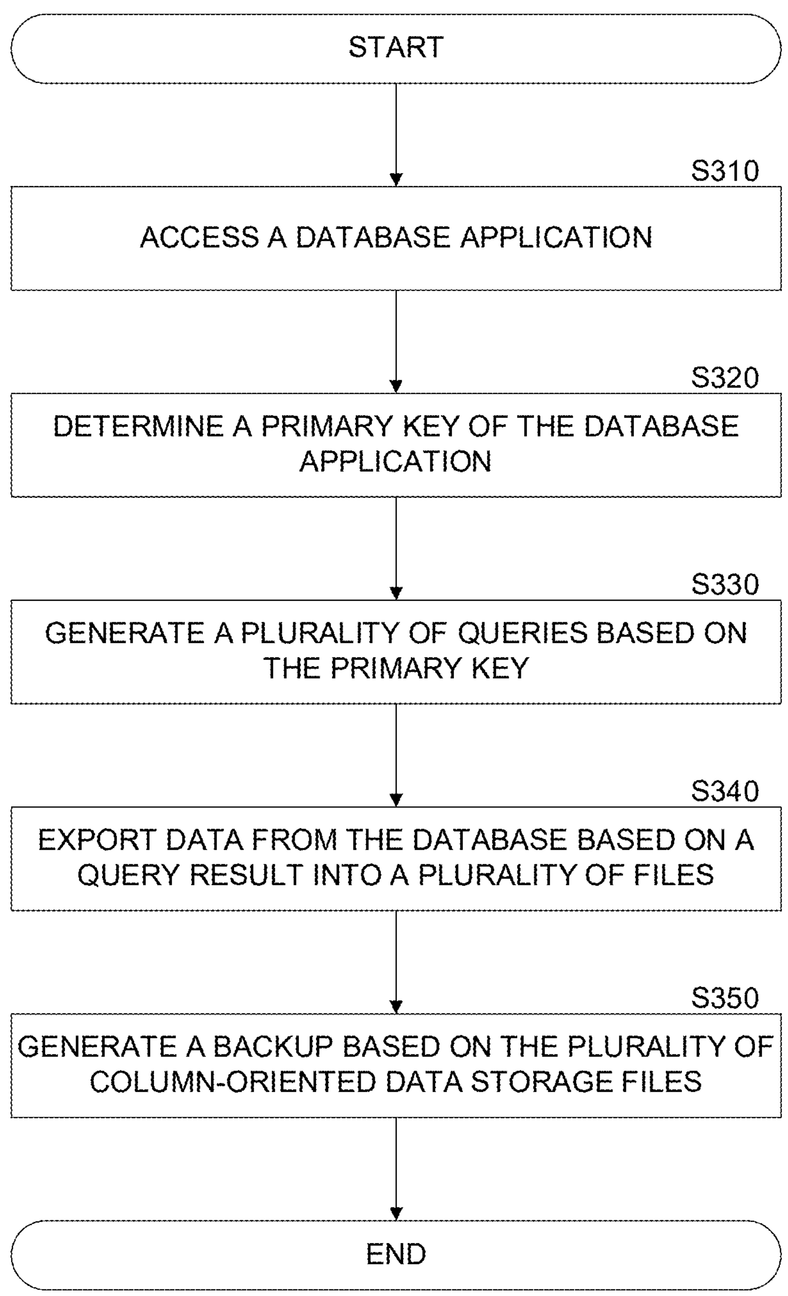
FIG. 3 is an example flowchart of a method for generating a database backup, implemented in accordance with an embodiment.

FIG. 3 is an example flowchart of a method for generating a database backup, implemented in accordance with an embodiment. The method may be performed by the backup system 140. In an embodiment, generating a database backup includes generating a backup of the machine hosting the database (which omits the data of the database) and generating a backup of the data of the database as two distinct backups.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. In an embodiment, a stand-alone database application is, for example, PostgreSQL, SQLite, MySQL, Oracle® Database, and the like.

At S320, a primary key of the database is determined. In an embodiment, the primary key is overridden, for example by a user input. In some embodiments, the primary key is an index of rows, for example. In an embodiment, the primary key includes a value assigned to each row, which is a unique value, such that no two rows include the same value of the primary key.

In some embodiments, a primary key is generated based on a composite of multiple-column identifiers. For example, in an embodiment, two identifiers, each of a distinct column, form together a primary key. In certain embodiments, a plurality of primary keys are selected, each primary key corresponding to a table of the database.

At S330, data is exported from the database. In an embodiment, exporting data from the database includes generating a plurality of queries. In an embodiment, the plurality of queries are generated, each based on a value range of the primary key. For example, in an embodiment, a first query of the plurality of queries is generated based on a value range of '0' to '10,000' of the primary key, and a second query of the plurality of queries is generated based on a value range of '10,001' to '20,000'. In an embodiment, there is no overlap between the values of the primary key for each of the generated queries. In an embodiment, the query is generated in a query language, such as SQL.

In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc.

At S340, a plurality of files are generated. In an embodiment, the plurality of files is generated in a column-oriented data format, such as Apache® Parquet. In some embodiments, the plurality of files is generated such that a file, a group of files, etc., corresponds to a result of executing a query of the plurality of queries. Thus, data is exported from the database into a plurality of data files.

In an embodiment, data is exported from the database application into the plurality of files by generating the plurality of queries, executing each query on the database, receiving a result for each query, and storing the results as a plurality of data files in a column-oriented data format.

In some embodiments, for example, where a logical backup is generated (e.g., utilizing pg_dump command), the plurality of files is generated by converting the logical backup into a plurality of column-oriented data format files.

At S350, a database data backup is generated. In an embodiment, the data backup is generated based on the plurality of data files. In some embodiments, the data backup includes a timestamp, a version identifier, and the like, which indicate a date, a time, a combination thereof, and the like, at which the data backup was generated. In an embodiment, the data backup is utilized in restoring a database.

In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files (e.g., Parquet files) and is also utilized to generate the machine backup, e.g., by extracting the metadata of the database, including views, store procedures, schema, etc.

It should be noted that a data backup is not the same as a storage backup. In a storage backup, a block-for-block copy of the storage device is created, which includes the database data and also includes a lot of data that is not useful for the actual database application, such as temporary files. It is therefore advantageous to store a backup only of the data of the database, without all the unnecessary files, folders, etc., which are not essential for the database to function properly.

In certain embodiments, a machine backup is generated, which includes data of the machine that is utilized to deploy the database application. Restoring a machine backup to a machine allows deployment of a machine that functions as the original machine, sans the data of the database. Once the data of the database application is written there, the machine is fully restored and functional.

In an embodiment, a machine backup is generated as a file-level backup, as a block-level backup, as a product key store, a combination thereof, and the like. The figures below discuss in more detail the generation of a machine backup utilizing various methods, and the restoration of a machine (e.g., restoring a virtualization instance) based on each such backup type.

In an embodiment, a machine backup includes data, information, and the like, which is utilized in restoring a machine. In some embodiments, restoring a machine includes generating a new machine according to the parameters of the original machine hosting the database.

Figure 4:
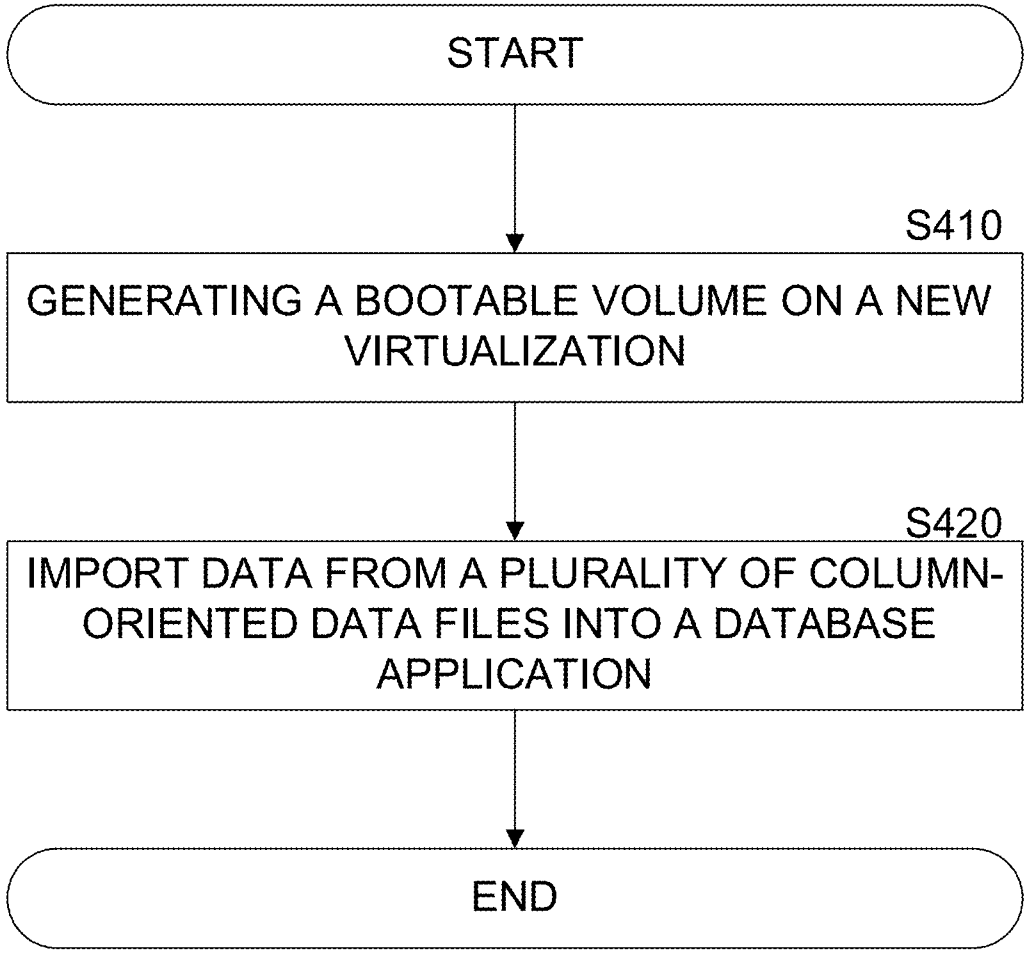
FIG. 4 is an example flowchart of a method for restoring a database from a file-level backup, implemented according to an embodiment.

FIG. 4 is an example flowchart of a method for restoring a database from a file-level backup, implemented according to an embodiment. The method may be performed by the backup system 140.

At S410, a bootable volume is generated. In an embodiment, the bootable volume is generated in a cloud computing environment. For example, in an embodiment, a bootable volume is a Microsoft® Azure Managed Disk, a GCP Persistent Disk, an AWS Elastic Block Store (EBS), and the like.

In an embodiment, the bootable volume is an empty bootable machine volume, which includes only, for example, an operating system and configuration files that are required to boot a virtual machine, compute instance, and the like.

In some embodiments, file system files, application files, configuration files, and the like, are stored in a backup from the original machine (i.e., the machine, workload, etc., from which the backup is generated) and are copied into the bootable volume.

At S420, data is imported into the bootable volume. In an embodiment, the data is imported from a plurality of column-oriented data format files. In certain embodiments, importing data includes reading a plurality of files and writing data from the plurality of files into a database application deployed on the bootable volume. In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file and restoring the logical backup (e.g., using pg_restore in this example) into the database application.

Figure 5:
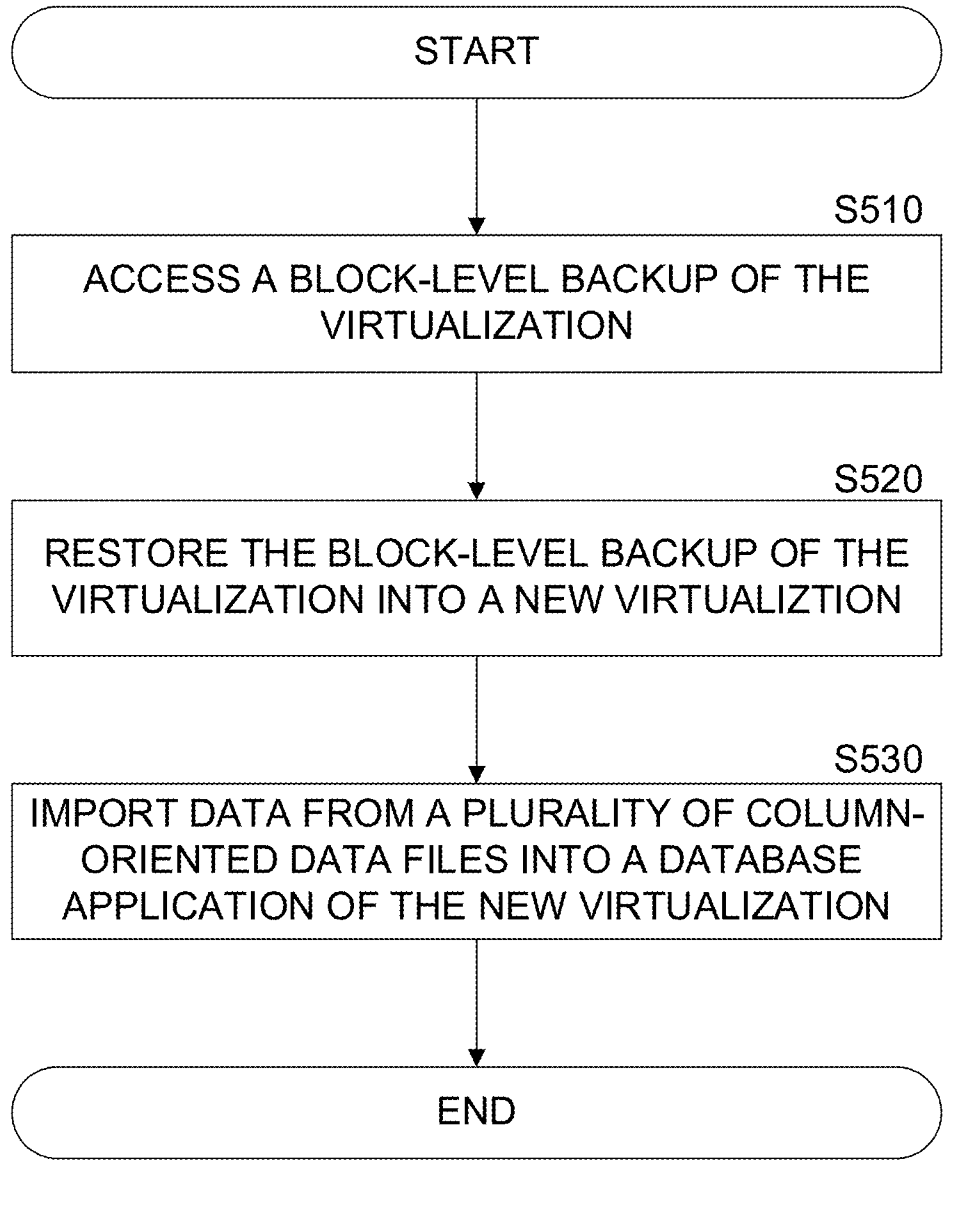
FIG. 5 is an example flowchart of a method for restoring a block-level database backup, implemented in accordance with an embodiment.

FIG. 5 is an example flowchart of a method for restoring a block-level database backup, implemented in accordance with an embodiment. The method may be performed by the backup system 140.

At S510, a block-level backup is accessed. In an embodiment, the block-level backup includes storage blocks that are not used for storing data of the database application (i.e., tables, rows, etc.). According to an embodiment, a block-level backup is accessed by accessing a file, a storage device, a cloud storage platform, a combination thereof, and the like, which allow access to the block-level backup. In some embodiments, a credential, a token, etc., is received (for example in response to a generated request) in order to access the block-level backup.

In an embodiment, the block-level backup is generated by initiating a block-level backup of a block device and releasing the blocks that are associated with data files of the virtualization instance. For example, in an embodiment, a table is dropped from the block-level backup, a file where a table is stored is zeroed out, etc. In an embodiment, dropping a table from a database application includes erasing all records (i.e., all data rows), deleting indexes, triggering permissions, etc., breaking foreign key constraints, releasing storage space assigned to the table, a combination thereof, and the like.

In some embodiments, a plurality of block-level backups are available, each corresponding to a different version of a backup. In an embodiment, a version is selected for restoring a machine.

At S520, the block-level backup is restored. In an embodiment, restoring a block-level backup to a new machine includes restoring a block device based on the block-level backup. In an embodiment, a block device is a Microsoft® Azure Managed Disk, a GCP Persistent Disk, an AWS Elastic Block Store (EBS), and the like. In some embodiments, the block device includes a filesystem (e.g., NTFS).

At S530, data is imported into the block device. In an embodiment, the data is imported from a plurality of column-oriented data format files. In certain embodiments, importing data includes reading a plurality of files and writing data from the plurality of files into a database application deployed on the restored device.

In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file and restoring the logical backup (e.g., using a pg_restore command in this example) into the database application.

Figure 6:
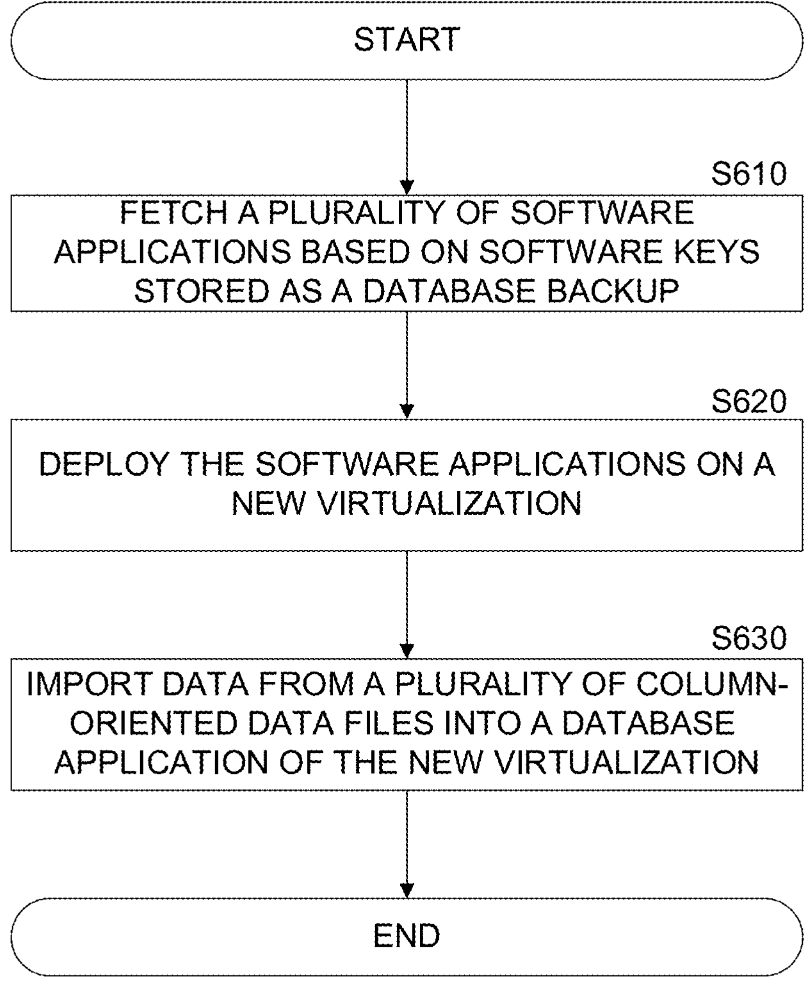
FIG. 6 is an example flowchart of a method for restoring a database based on a product key backup, implemented in accordance with an embodiment.

FIG. 6 is an example flowchart of a method for restoring a database based on a product key backup, implemented in accordance with an embodiment. The method may be performed by the backup system 140.

In an embodiment, a product key is detected on a machine, virtualization, and the like, on which a database application is deployed. In an embodiment, the product key is detected by scanning the virtualization, performing static analysis on a snapshot of the virtualization, a combination thereof, and the like. In some embodiments, a plurality of product keys are detected on a virtual machine. In an embodiment, the product keys are stored as a backup of the virtual machine, such that it is possible to restore the virtual machine based on the stored product keys, where the restored virtualization is capable of deploying a database application.

At S610, a plurality of product keys are fetched. In an embodiment, fetching the plurality of product keys includes detecting a plurality of software applications, each corresponding to a product key, deployed on a virtualization on which a database application is deployed.

In some embodiments, a group of product keys all correspond to a single software application, each product key corresponding to a unique version of the product key. In an embodiment, only a most recent product key is stored. In some embodiments, every detected product key is stored as a virtualization backup.

At S620, a software application is deployed. In an embodiment, the software application is deployed on a virtual machine which is generated by configuring an orchestrator to generate a machine that is capable of executing the software associated with the product key. In an embodiment, such a virtual machine constitutes a rebuilt machine and is implemented, for example, as a virtual machine, a software container, a serverless function, a combination thereof, and the like.

In some embodiments, deploying a software application includes installing binaries, libraries, and the like, which the software application requires for execution. In an embodiment, a version of the software is deployed based on a product key. In certain embodiments, a plurality of product keys each correspond to a version of the software. In some embodiments, a single key of the plurality of product keys is utilized to deploy only the most recent (or up-to-date) version of the software.

Deploying software in this manner assures that the database software is kept up to date, and does not include any vulnerabilities, misconfigurations, etc., even when the data that is being restored corresponds to a point in time where the database application had a previous version, which has since been replaced by a new version.

For example, a database application is Microsoft® Access version 2206 in a first backup, and version 2409 in a subsequent version. In an embodiment, it is advantageous to restore data from the first backup (i.e., when the application was version 2206) and restore the database application to version 2409, to avoid any vulnerability, misconfiguration, and the like, which is associated with version 2206.

At S630, data is imported into the rebuilt machine. In an embodiment, the data is imported from a plurality of column-oriented data format files. In certain embodiments, importing data includes reading a plurality of files and writing data from the plurality of files into a database application deployed on the restored device.

In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file and restoring the logical backup (e.g., using pg_restore in this example) into the database application.

In some embodiments, a database backup is generated from a relational database service (RDS), such as Amazon® RDS. In such embodiments, the database backup does not include machine-specific data, as the cloud computing infrastructure (e.g., AWS) provides machine data as needed (e.g., for restoration), FIG. 7A is an example diagram of a database backup generated a first time for querying across a timespan, implemented in accordance with an embodiment. In an embodiment, a database includes a table 710 which is snapshotted at a first time. In some embodiments, a backup is generated of the table 710 at a first time. In certain embodiments, the backup includes a plurality of backup objects, such as a first backup object 712, and a second backup object 714.

In an embodiment, a backup object is a column-oriented file, such as a Parquet file. In some embodiments, the column-oriented file format is updated to include a row identifier column. In an embodiment, each row is assigned to a group. For example, according to an embodiment, row groups are determined based on a weak hash which in turn is generated based on a value, a plurality of values, etc., of a specific row.

In some embodiments, a temporal table 716 is generated, which includes identifiers of row groups that are part of a database backup at a first time. In an embodiment, the temporal table 716 includes a column of row identifiers.

FIG. 7B is an example diagram of a database backup generated a second time for querying across a timespan, implemented in accordance with an embodiment. In an embodiment, the table 710 is updated as a second table 720 at a second time. In this example, row 8 is deleted, row 22 is updated, and row 23 is added. According to an embodiment, a third backup object 722 is generated.

In an embodiment, the third backup object 722 is generated as a result of deduplication based on reading the second table 720 at a second time, the reading being based on the primary key used on the table 710 at the first time.

According to an embodiment, deduplication includes detecting a row, a group of rows, etc., which are changed, altered, deleted, etc., between a first time and a second time. In an embodiment, such changes are stored in a third backup object 722.

For example, according to an embodiment, a weak hash is generated for each row, and a strong hash is generated for each row group. In an embodiment, where a strong hash has changed between row groups of the table at two different times (e.g., a group having the first five rows of a table at a first time and a group having the first five rows at a second time) this indicates that a value of at least a row of the row group has changed between reads of database backups.

In certain embodiments, a second temporal table 726 is generated for the second backup, which indicates which row groups should be read to restore the database to the second time.

In an embodiment, the backup data after the second time includes the first backup object 712, the second backup object 714, and the third backup object 722. According to an embodiment, the backup data also includes the first temporal table 716, and the second temporal table 726.

This allows, in some embodiments, to store a deduplicated database backup, which can be restored to various time points (e.g., the first time and the second time) based on the temporal tables, and also can be queried by applying queries to the database objects, as described for example in more detail below.

According to an embodiment, a relevance table is generated. An example relevance table 730 is shown in FIG. 7B. In an embodiment, the relevance table 730 includes a start point (e.g., start snap) and end point (e.g., end snap) which correspond to points in time during which a specific row group is relevant. For example, row groups 7 and 8 were not present in the first backup, and were present in the second backup, therefore their "start snap" is an identifier of the second backup (e.g., '2') which is the first time these row groups were backed up. Row groups 1 and 4 were not present in the second backup, therefore their "end snap" is an identifier of the last backup during which they were present (e.g., '1'). As each backup is associated with a point in time, querying across time and across multiple backups (each corresponding to a point in time) is possible due to being able to differentiate which row groups were in the database at any particular point in time.

For example, in an embodiment, where a row group changes between two snapshots (i.e., points in time at which a database is snapshotted for backup generation) the end point is indicated in a column in the relevance table.

As an example, row group 1 of FIG. 7A includes rows 5, 6, and 8. In an embodiment, row 8 is deleted between the backup of the database table 710 generated for the database of FIG. 7A and the backup of the database table 720 shown in FIG. 7B. The rows previously associated with row group 1 which were not deleted are now associated with group 7, which is newly generated for the backup of the database table 720.

In an embodiment, each time a row group is generated (e.g., a row group identifier is assigned) a record is entered into the relevance table 730 to indicate that a row group was generated for a backup point having a corresponding identifier.

In certain embodiments, where a row group is not detected in a following backup, the relevance table 730 is updated to indicate that the row group was last detected in a backup point having a corresponding identifier.

Figure 8:
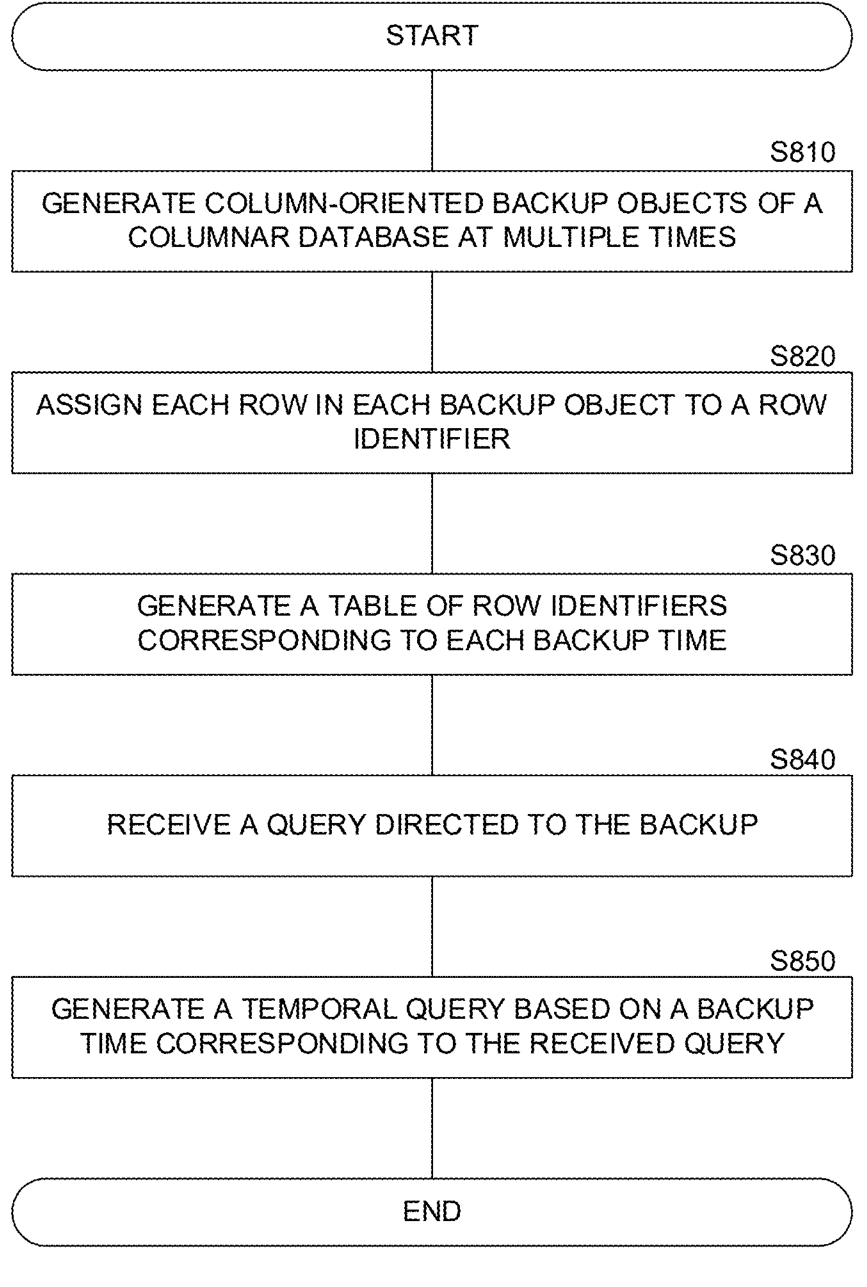
FIG. 8 is an example flowchart of a method for generating a database backup and querying the same from multiple time points, implemented in accordance with an embodiment.

FIG. 8 is an example flowchart of a method for generating a database backup and querying the same from multiple time points, implemented in accordance with an embodiment.

At S810, a plurality of backups are generated. In an embodiment, a first backup is generated at a first time, and a second backup is generated at a second time, after the first time. In certain embodiments, generating a backup includes reading a plurality of rows from a database based on a determined primary key.

In an embodiment, the primary key is the same key for each reading of the database at each backup generation point in time. According to an embodiment, a weak hash is generated for each row. In an embodiment, the weak hash is generated based on at least a value of the row. In some embodiments, a group cutoff condition is predetermined based on a value of the weak hash. For example, in an embodiment, a weak hash is generated for each row and a condition is set based on a value (e.g., least significant character) of the weak hash. According to an embodiment, every row between two rows, each satisfy satisfies the cutoff condition, is allocated to the same row group.

In some embodiments, rows of row groups are stored in a column-oriented format file, such as a Parquet file. In an embodiment, a strong hash is generated for a group of rows, which is utilized to determine if a row group includes a row that has a change (e.g., a deletion, addition, update, etc., of a row).

In an embodiment, a change in a row causes a change in the value of the strong hash, thereby indicating that the row group has changed. This allows for generating differential backups by storing at subsequent backup times only rows that have changed values, thereby reducing the size of the backup.

At S820, a row group identifier is assigned. In an embodiment, a database backup object includes a column-oriented file in which a plurality of rows are stored. In some embodiments, the column-oriented file is updated to include an additional column (e.g., which is not present in the database), which has a value that indicates an identifier of a row group. For example, the first backup object 712 of FIG. 7A above includes a "Row ID Group" column having a value for each row indicating which row group a specific row is associated with.

In some embodiments, a column-oriented file includes a plurality of rows, each row assigned to a row group of a plurality of row groups. In some embodiments, a plurality of rows of a first database backup object (e.g., column-oriented file) and a plurality of rows of a second database backup object include rows associated with a same row group, provided that both backup objects are a backup object corresponding to a first time.

In an embodiment, a column-oriented file includes a plurality of row groups, each row group associated with a plurality of rows stored in the column-oriented file. In some embodiments, a row group is a unique identifier, such that no two groups of rows share the same identifier.

At S830, a temporal table is generated. In an embodiment, a temporal table includes a column of identifiers of row groups of a database backup at a particular point in time. In the example of FIGS. 7A and 7B the first temporal table 716 includes row groups 0, 1, 2, 3, 4, 5, and 6, while the second temporal table includes row groups 0, 2, 3, 5, 6, 7, and 8.

In an embodiment, each temporal table is associated with a database backup point in time. In some embodiments, a temporal table includes a first column having row identifiers, and a second column having point-in-time identifiers. In an embodiment, a point-in-time identifier identifies a specific backup point (i.e., a point in time at which a backup is generated).

At S840, a query is received. In an embodiment, the query is received for execution on a backup of the database. In some embodiments, the query is a structured query, such as a SQL query.

A SQL query is a structured command used to interact with a database. A SQL query is utilized to retrieve, manipulate, or modify data by using statements like SELECT, INSERT, UPDATE, or DELETE. A query typically specifies at least a table to interact with, the columns of interest, conditions for filtering rows, and optional clauses for grouping, sorting, or joining data.

In an embodiment, a query is received with a temporal constraint, such as a date range, a time range, and the like. In an embodiment, the temporal constraint spans a time frame that includes data points from a plurality of backups.

At S850, a temporal query is generated. In an embodiment, the temporal query is generated based on the received query and based on at least a temporal table. According to an embodiment, the temporal query is executed on a plurality of data objects. In some embodiments, the temporal query is executed on all the data objects of a backup system, and modified to return a value from a column indicating a row identifier.

In some embodiments, where a relevance table is utilized, query results corresponding each to a row group of a plurality of row groups are joined based on an intersection of the time frame of the temporal query and the time frame indicated by the start and end points indicated in the relevance table.

The following example tables illustrate the operation of such backups as described in more detail herein.

TABLE 8.1

| NAME | DATE | SALARY |
|---|---|---|
| Joe | Jan. 1, 2021 | 1000 |
| James | Jan. 1, 2021 | 1000 |

TABLE 8.2

| NAME | DATE | SALARY |
|---|---|---|
| Joe | Feb. 1, 2021 | 2000 |
| James | Jan. 1, 2021 | 1000 |

TABLE 8.3

| NAME | DATE | SALARY |
|---|---|---|
| Joe | Mar. 1, 2021 | 2000 |
| James | Mar. 1, 2021 | 2000 |

TABLE 8.4

| NAME | DATE | SALARY |
|---|---|---|
| Joe | Apr. 1, 2021 | 3000 |
| James | Mar. 1, 2021 | 2000 |

In this example, each table reflects the database as backed up at a different point in time. Since the backups are stored in a column-oriented format, the queries such as:

```
Select*where name=joe
```

are made possible, resulting in a table:

| NAME | DATE | SALARY |
|---|---|---|
| Joe | Jan. 1, 2021 | 2000 |
| Joe | Mar. 1, 2021 | 2000 |
| Joe | Apr. 1, 2021 | 3000 |

The results are joined from each backup. Since there is no change between the first backup (Table 8.1) and the second backup (Table 8.2) in the value (other than the update date), only a single entry is presented in the result.

Utilizing a temporal table allows querying the database backup as it was at a specific point in time. That is, the disclosed embodiments allow for querying the database at multiple points in time with the same query. The query can be directed to a range of timestamps, and the results will be joined based on ROW ID groups only from table versions of the required time range. In certain embodiments, utilizing a relevance table allows querying the table across multiple points in time, which is useful for example for discerning changes across time.

Figure 9:
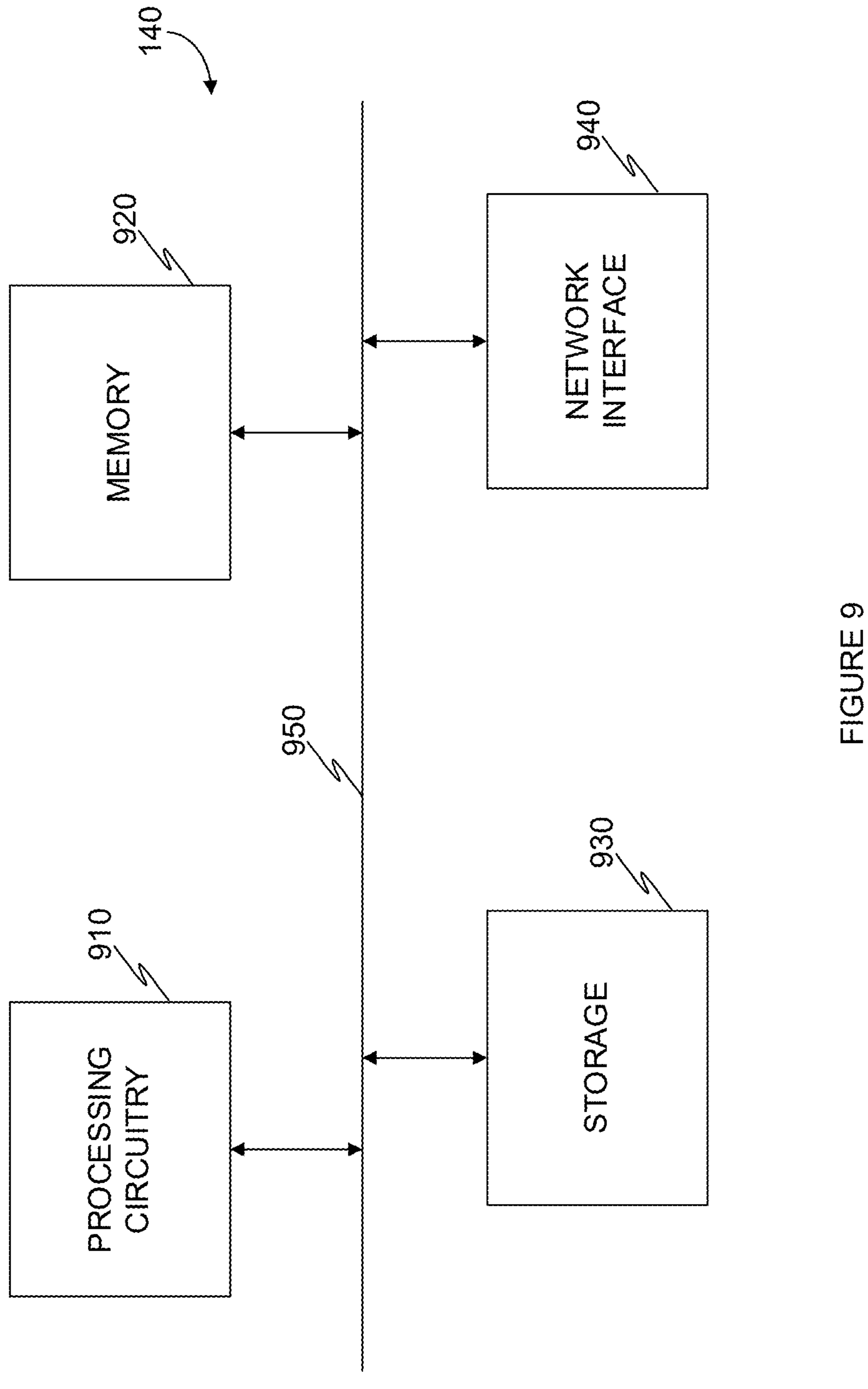
FIG. 9 is an example schematic diagram of a backup system according to an embodiment.

FIG. 9 is an example schematic diagram of a backup system 140 according to an embodiment. The backup system 140 includes, according to an embodiment, a processing circuitry 910 coupled to a memory 920, a storage 930, and a network interface 940. In an embodiment, the components of the backup system 140 are communicatively connected via a bus 950.

In certain embodiments, the processing circuitry 910 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 920 is a volatile memory (e.g., random access memory, etc.), a non-volatile memory (e.g., read-only memory, flash memory, etc.), a combination thereof, and the like. In some embodiments, the memory 920 is an on-chip memory, an off-chip memory, a combination thereof, and the like. In certain embodiments, the memory 920 is a scratch-pad memory for the processing circuitry 910.

In one configuration, software for implementing one or more embodiments disclosed herein is stored in the storage 930, in the memory 920, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 910, cause the processing circuitry 910 to perform the various processes described herein, in accordance with an embodiment.

In some embodiments, the storage 930 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 940 is configured to provide the backup system 140 with communication with, for example, the network 130, workload 110, database application 120, etc., according to an embodiment.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a temporal query ready database backup, the method comprising:

generating a plurality of backups of a database, each of the backups including a plurality of backup data objects, each of the backup data objects including a plurality of rows stored in a file having a column-oriented format, and each backup corresponding to a unique point in time;

assigning each row in a file to a row group, the row group having a unique identifier;

generating a temporal table including a first column of row group identifiers for each backup of the plurality of backups and a second column of point-in-time identifiers, each point-in-time identifier identifying a specific backup point;

receiving a query for a backup of the plurality of backups;

generating, based on the query and the temporal table, a temporal query;

executing the temporal query on a plurality of the backup data objects, wherein the temporal query is modified to return a value from a column indicating a row identifier; and generating a query result based on the temporal table and at least the respective backup data object.

2. The method of claim 1, further comprising:

generating a relevancy table based on each unique identifier; and inserting a first value in the relevancy table indicating a first time of entry for a unique identifier.

3. The method of claim 2, further comprising:

inserting a second value in the relevancy table indicating a final time of entry for the unique identifier.

4. The method of claim 3, further comprising:

inserting the second value in response to determining that a row group corresponding to the unique identifier includes a row with a changed value.

5. The method of claim 2, further comprising:

generating the query result further based on the relevancy table.

6. The method of claim 1, further comprising:

joining a plurality of query results, each query result based on a backup data object.

7. The method of claim 6, further comprising:

joining the plurality of query results based on a row identifier.

8. The method of claim 1, further comprising:

assigning each row to a row group based on a hash value generated for a row of the row group.

9. The method of claim 1, further comprising:

generating a plurality of temporal tables, each temporal table including identifiers of row groups stored in a backup generated at a time corresponding to a time associated with the temporal table.

10. A non-transitory computer-readable medium storing a set of instructions for generating a temporal, query-ready database backup, the set of instructions comprising:

one or more instructions that, when executed by one or more processors of a device, cause the device to:

generate a plurality of backups of a database, each of the backups including a plurality of backup data objects, each of the backup data objects including a plurality of rows stored in a file having a column-oriented format, and each backup corresponding to a unique point in time;

assign each row in a file to a row group, the row group having a unique identifier;

generate a temporal table including a first column of row group identifiers for each backup of the plurality of backups and a second column of point-in-time identifiers, each point-in-time identifier identifying a specific backup point;

receive a query for a backup of the plurality of backups;

generate, based on the query and the temporal table, a temporal query;

execute the temporal query on a plurality of the backup data objects, wherein the temporal query is modified to return a value from a column indicating a row identifier; and generate a query result based on the temporal table and at least the respective backup data object.

11. A system for generating a temporal, query-ready database backup, comprising:

one or more processors configured to:

generate a plurality of backups of a database, each of the backups including a plurality of backup data objects, each of the backup data objects including a plurality of rows stored in a file having a column-oriented format, and each backup corresponding to a unique point in time;

assign each row in a file to a row group, the row group having a unique identifier;

generate a temporal table including a first column of row group identifiers for each backup of the plurality of backups and a second column of point-in-time identifiers, each point-in-time identifier identifying a specific backup point;

receive a query for a backup of the plurality of backups;

generate, based on the query and the temporal table, a temporal query;

execute the temporal query on a plurality of the backup data objects, wherein the temporal query is modified to return a value from a column indicating a row identifier; and generate a query result based on the temporal table and at least the respective backup data object.

12. The system of claim 11, wherein the one or more processors are further configured to:

generate a relevancy table based on each unique identifier; and insert a first value in the relevancy table indicating a first time of entry for a unique identifier.

13. The system of claim 12, wherein the one or more processors are further configured to:

insert a second value in the relevancy table indicating a final time of entry for the unique identifier.

14. The system of claim 13, wherein the one or more processors are further configured to:

insert the second value in response to determining that a row group corresponding to the unique identifier includes a row with a changed value.

15. The system of claim 12, wherein the one or more processors are further configured to:

generate the query result further based on the relevancy table.

16. The system of claim 11, wherein the one or more processors are further configured to:

join a plurality of query results, each query result based on a backup data object.

17. The system of claim 16, wherein the one or more processors are further configured to:

join the plurality of query results based on a row identifier.

18. The system of claim 11, wherein the one or more processors are further configured to:

assign each row to a row group based on a hash value generated for a row of the row group.

19. The system of claim 11, wherein the one or more processors are further configured to:

generate a plurality of temporal tables, each temporal table including identifiers of row groups stored in a backup generated at a time corresponding to a time associated with the temporal table.

* * * * *